W. T. HILL.
TROLLEY WHEEL ATTACHMENT.
APPLICATION FILED JUNE 28, 1919.

1,380,959.

Patented June 7, 1921.

WITNESSES
J H Crawford

INVENTOR.
W. T. Hill,
BY Victor J. Evans
ATTORNEY.

UNITED STATES PATENT OFFICE.

WILLIAM T. HILL, OF BALTIMORE, MARYLAND.

TROLLEY-WHEEL ATTACHMENT.

1,380,959.  Specification of Letters Patent.  Patented June 7, 1921.

Application filed June 28, 1919. Serial No. 307,263.

*To all whom it may concern:*

Be it known that I, WILLIAM T. HILL, a citizen of the United States, residing at Baltimore, Maryland, have invented new and useful Improvements in Trolley-Wheel Attachments, of which the following is a specification.

This invention comprehends the provision of a trolley wheel attachment adapted to prevent the wheel from becoming separated from the trolley wire, the invention residing in the construction, combination and arrangement of parts as claimed.

In the drawing forming part of this specification, like numerals of reference indicate similar parts in the several views, and wherein.

Figure 1:
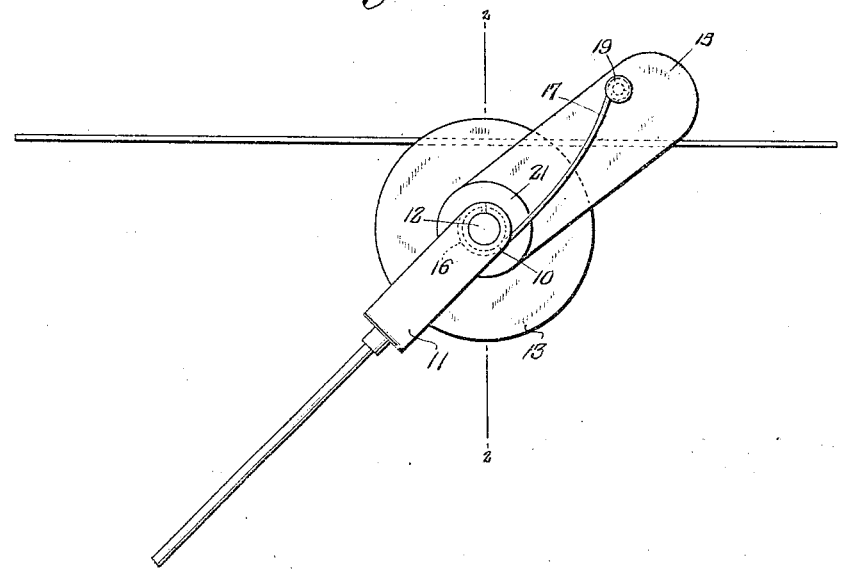
Figure 1 is a perspective view showing the manner of holding the trolley wheel associated with the trolley wire in accordance with my invention.
Figure 2:
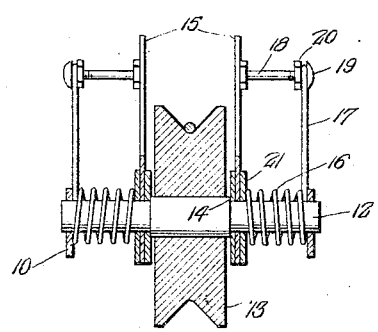
Fig. 2 is a sectional view taken on line 2—2, of Fig. 1.

Referring to the drawing in detail 10 indicates the hub provided at one end with a yoke 11, between the terminals of which the axle 12 is arranged, the trolley wheel 13 being loosely mounted upon the axle for rotation.

The opposite ends of the axle are reduced to provide shoulders 14 against which the retaining elements 15 engage, these elements being provided with an opening for the reception of the axle as illustrated. The elements 15 are in the nature of elongated plates arranged at opposite sides of the wheel 13 and normally held in the manner shown in Fig. 1 to prevent the trolley wheel from jumping away from the trolley wire.

Coiled about the adjacent extremity of the axle, are springs 16 having one end secured to the axle in any suitable manner, while the outermost convolution of each spring is extended to provide a resilient arm 17, which is terminally looped around a stud 18 projecting from the retaining plate 15. Each stud is provided with a head 19 and is threaded to accommodate an adjusting nut 20, between which and the head 19 the looped terminal of the arm 17 is gripped.

Manifestly, the resilient arms tend to hold the plates 15 normally in a position illustrated in Fig. 1, while the springs 16 exert a lateral tension against the disks 21, so that the plates 15 are frictionally held in proper position between the shoulders 14 and the disks 21. Obviously, the springs 16 and resilient arms 17 while holding the plates 15 normally in a position to project above the wheel, permit the plates 15 to yield when brought into engagement with the cross wires. Again, it will be noted that by reason of the manner of mounting the plates 15 upon the axle, that when turning curves, either of the plates 15 which initially come in contact with the cross wire is permitted to yield independently of the other plate. The attachment is simple in construction, and very efficient for the purpose intended.

While it is believed that from the foregoing description the nature and advantages of the invention will be readily apparent, I desire to have it understood that I do not limit myself to this exact construction, and that such changes may be resorted to when desired as fall within the scope of what is claimed.

What is claimed is:—

A trolley wheel attachment comprising in combination with a yoke, and an axle thereon, of a pair of elongated members mounted upon the axle at the opposite sides of the wheel and extended beyond the periphery thereof, a stud projecting laterally from the outer side of each member, disks loosely mounted upon the axle and arranged at opposite sides of said elongated members, a coiled spring surrounding said axle at each side of the wheel, said springs exerting pressure against said disks whereby said elongated members are frictionally maintained in position upon the axle, and the final convolution of each spring being extended to provide a resilient arm which is connected with the adjacent stud, whereby said elongated members are yieldably held above the wheel and closely associated for the purpose specified.

In testimony whereof I affix my signature.

WILLIAM T. HILL.